United States Patent
Ziesel et al.

(10) Patent No.: US 10,603,705 B2
(45) Date of Patent: Mar. 31, 2020

(54) METHOD FOR ROLL-FORMING DISK CARRIERS OR THE LIKE AND THE ASSOCIATED PROFILE ROLLER SET

(71) Applicants: WEBO Werkzeugbau Oberschwaben GmbH, Amtzell (DE); Transform Automotive LLC, Inc., Sterling Heights, MI (US)

(72) Inventors: Norbert Ziesel, Amtzell (DE); Thomas Meier, Rochester Hills, MI (US)

(73) Assignees: TRANSFORM AUTOMOTIVE LLC, Sterling Heights, MI (US); WEBO WERKZEUGBAU OBERSCHWABEN GMBH, Amtzell (DE)

( * ) Notice: Subject to any disclaimer, the term of this patent is extended or adjusted under 35 U.S.C. 154(b) by 33 days.

(21) Appl. No.: 15/175,316

(22) Filed: Jun. 7, 2016

(65) Prior Publication Data

US 2017/0028454 A1    Feb. 2, 2017

(30) Foreign Application Priority Data

Jul. 31, 2015   (DE) .................. 10 2015 009 733

(51) Int. Cl.
*B21D 5/08* (2006.01)
*B21H 5/02* (2006.01)
*B21H 7/18* (2006.01)
*B21H 1/20* (2006.01)
(Continued)

(52) U.S. Cl.
CPC .............. *B21D 5/08* (2013.01); *B21D 15/02* (2013.01); *B21D 53/28* (2013.01); *B21H 1/20* (2013.01); *B21H 5/02* (2013.01); *B21H 5/025* (2013.01); *B21H 7/187* (2013.01)

(58) Field of Classification Search
CPC .......... B21H 1/20; B21H 5/02; B21H 5/5025; B21D 53/28; B21D 15/02; B21D 5/08
See application file for complete search history.

(56) References Cited

FOREIGN PATENT DOCUMENTS

| DE | 2549230 A1 | 9/1976 |
|---|---|---|
| DE | 19531907 A1 | 3/1997 |
| DE | 10150308 A1 | 9/2002 |

(Continued)

OTHER PUBLICATIONS

Machine translation of DE102009044544A1, Oesterreich, pp. 1-27, translated on Sep. 26, 2017.*

*Primary Examiner* — Teresa M Ekiert
(74) *Attorney, Agent, or Firm* — Browdy and Neimark, PLLC

(57) ABSTRACT

A method for roll-forming disk carriers or the like, which are designed as a pot-shaped sheet metal part having inner and outer teeth, wherein a multitude of cassettes is equidistantly arranged on the circumference of a roll-forming tool, said cassettes having profile rollers arranged in their interior, which roll out the disk carrier to be formed with their outer circumference and thus impart toothing on the disk carrier to be formed, wherein the forming depth of the profile rollers at the disk carrier to be formed is designed in such a way that a narrow, peripheral, self-contained, unformed bridge remains between the inner diameter and the outer diameter of the toothing, wherein the bridge increases the engine-speed strength of the disk carrier as a hoop band cylinder that is integrated into the toothing.

11 Claims, 8 Drawing Sheets

(51) Int. Cl.
*B21D 53/28* (2006.01)
*B21D 15/02* (2006.01)

(56) References Cited

FOREIGN PATENT DOCUMENTS

| | | | |
|---|---|---|---|
| DE | 102006007501 A1 | 8/2007 | |
| DE | 102006020902 A1 | 11/2007 | |
| DE | 102006025034 A1 | 11/2007 | |
| DE | 102008017608 B3 | 4/2009 | |
| DE | 102009044544 A1 * | 5/2011 | ............ B21D 17/04 |
| DE | 102010053547 A1 | 6/2012 | |
| DE | 102013006150 A1 | 10/2014 | |
| DE | 102013006216 A1 | 10/2014 | |
| DE | 102013216747 A1 | 2/2015 | |
| DE | 102013221391 A1 | 4/2015 | |

* cited by examiner

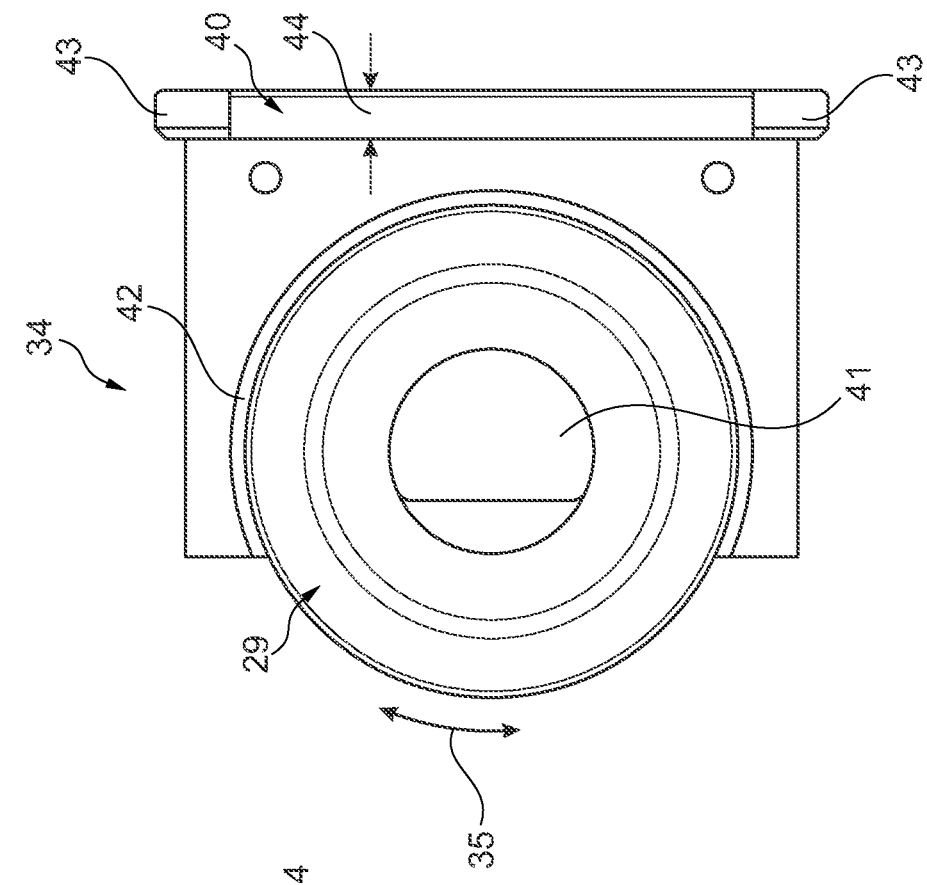
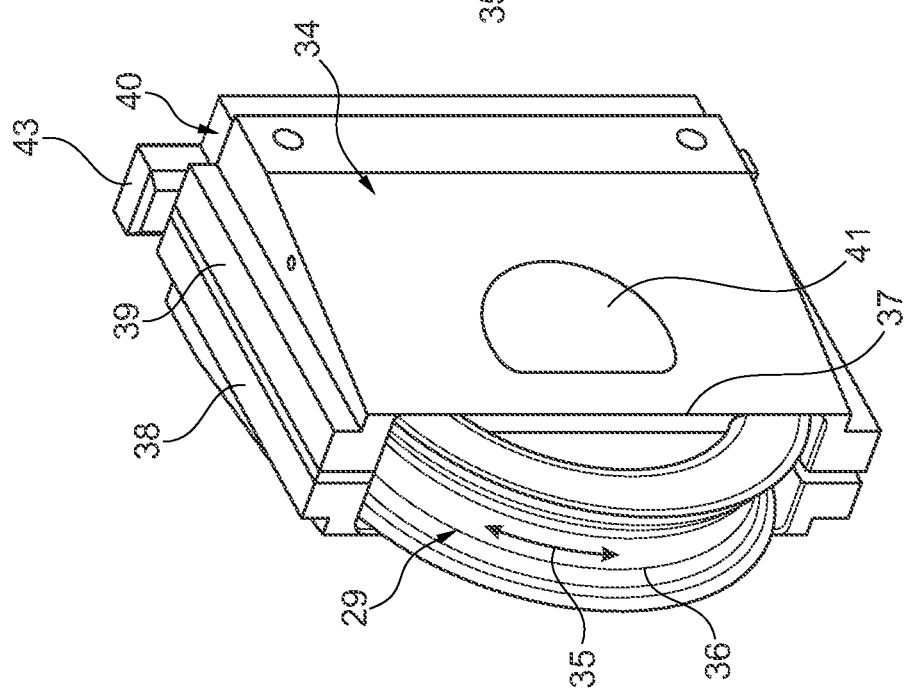

METHOD FOR ROLL-FORMING DISK CARRIERS OR THE LIKE AND THE ASSOCIATED PROFILE ROLLER SET

FIELD

The invention relates to a method for roll-forming disk carriers or the like which are designed as a pot-shaped sheet metal part having inner and outer teeth, a component produced with the profile roller set, and a component produced with said method.

BACKGROUND

A profile roller set with a roll-forming tool is known, for example, from the subject of DE 10 2010 053 547 A1, which was filed by the same applicant. The roll-forming tool described therein is developed further within the context of the present invention.

All information contained in said publication DE 10 2010 053 547 A1 is to be fully incorporated by reference in the present application as is fully set forth herein.

Furthermore, the same subject is known from DE 10 2013 006 216 A1, which also originated from the same applicant. Its information content is to be fully incorporated by reference herein in the description of the present invention as well.

An object (component) produced with a roll-forming tool according to DE 10 2013 006 216 A1 or DE 10 2010 053 547 A1 is described, for example, in DE 10 2013 006 150 A1. This publication also describes the roll-forming process in detail and accordingly, this invention description is to be fully incorporated by reference herein in the description of the present invention as well.

A description of a profile roller set according to the invention can therefore be found in one or more of the above publications.

Such a profile roller set is characterized in that a multitude of cassettes is equidistantly arranged over the outer circumference of a roll-forming tool, having profile rollers in their interior spaces, which roll out with their outer circumference the outer periphery of a component to be formed and therefore impart toothing to the component to be formed.

The manufacture of such rotationally symmetrical components aims, for example, at the production of a disk carrier for a double clutch system as described in DE 10 2013 216 747 A1.

However, the disadvantage of such a disk carrier is that its toothing geometry is shaped in the manner of corrugated sheet metal, meaning that the teeth have a small radius, but are equidistantly arranged over the outer circumference in a wave-like manner, which results in a profile as described, for example, in DE 10 2013 216 747 A1.

The application of such a disk carrier for a double clutch is the subject of, for example, DE 10 2014 211 633 A1 or DE 10 2012 213 119 B3.

The disadvantage of such disk carriers according to the prior art is their low engine-speed strength. This means that the part stretches at high speeds and that the wave-like toothing tends to level in the direction of the centrifugal force effect, which can damage the disk carrier.

The described disk carriers therefore only have low engine-speed strength. Such disk carriers can be operated at maximum speeds ranging from, e.g., 10,000 to 14,000 revolutions per minute. This defines the speed limitation of the disk carriers known from the prior art. The specified range is only a preferred embodiment. Higher speed ranges can be achieved.

Disk carriers designed in such a way that a narrow, peripheral, self-contained and unformed bridge remains between the inner diameter and the outer diameter of the toothing are known from multiple embodiments. The bridge is arranged in the toothing as an integrated hoop band cylinder, intended to increase the engine-speed strength of the disk carrier.

However, the prior art employs completely different methods of production, which are considered disadvantageous.

The unformed bridge of disk carriers is intended to achieve axial rigidity in the disk carrier to reduce flaring at high speeds.

The production of such disk carriers with the so-called hoop band used to employ an extruder mold for extruding the component. It is a cold rolling process, in which the component, consisting of a deformable sheet metal part, is generated by pressing it through an extruder mold. This requires bonderizing the component, meaning it has to be coated, which calls for an additional production process. Furthermore, the application of the known extrusion process cannot produce the same precision as the arrangement of the present invention.

Due to the anisotropy of the utilized sheet metal materials, asymmetries always occur during the extrusion process, which leads to undesirable and uncontrollable deformations that affect the accuracy of the disk carrier. The inaccuracies caused by the material's anisotropy do not occur during the extrusion process per se, but after removing the formed piece from the mold, as it springs back in an undesired manner that causes inaccuracies.

Furthermore, a method for the production of the disk carriers discussed herein by way of spin-forming rollers is known. However, this production process is very slow due to the technology of the utilized method.

In this method, a pre-formed piece is moved over a central, grooved mandrel and one or more profile rollers move around the pre-formed piece held on the mandrel. The roller pressure shapes the blank into the central original form.

There is also a single-groove rolling method, which works in such a way that the individual grooves of the workpiece are rolled out in sequence with a single tool, which is associated with a lengthy production time and also with inaccuracies that have to be accepted.

A further known method known as flat die rolling, in which the grooves of the workpiece are shaped with two opposite vertical toothing dies to create a profile in a longitudinal movement. This method is also associated with a long production time and inaccuracies that must be accepted.

A further known method is the hard stamping method, in which forming is achieved with forming rollers that hit the workpiece in the manner of hammers.

This method can only be used with a low production output.

Accordingly, the present invention is based on the task of optimizing a method and a tool to be used with the method for rolling disk carriers which are designed as a pot-shaped sheet metal part having inner and outer teeth in such a way that the resulting disk carriers show improved dimensional accuracy and a higher engine-speed strength.

In the prior art, it was necessary to reinforce the wall thickness of the disk carrier to increase engine-speed strength or to reinforce it with additional rigidity aids to achieve a high engine-speed strength.

SUMMARY

The invention therefore proposes a method and a profile roller set used with the method and a disk carrier formed with the above-referenced method that is suitable for producing a disk carrier with higher engine-speed strength and minimized wall thickness and high production output with a hitherto unknown dimensional accuracy.

To solve this problem, a first embodiment of the invention provides a method for roll-forming disk carriers or the like which are designed as a pot-shaped sheet metal part having inner and outer teeth, wherein a multitude of cassettes is equidistantly arranged on the circumference of a roll-forming tool, the cassettes having profile rollers arranged in their interior, which roll out the disk carrier to be formed with their outer circumference and thus impart toothing on the disk carrier to be formed, wherein the forming depth of the profile rollers at the disk carrier to be formed is designed in such a way that a narrow, peripheral, self-contained, unformed bridge remains between the inner diameter and the outer diameter of the toothing, wherein the bridge increases the engine-speed strength of the disk carrier as a hoop band cylinder that is integrated into the toothing.

According to a second embodiment, a profile roller set for roll-forming disk carriers or the like is provided, which are designed as a pot-shaped sheet metal part having inner and outer teeth, wherein a multitude of cassettes is equidistantly arranged on the circumference of a roll-forming tool, the cassettes having profile rollers arranged in their interior, which roll out the disk carrier to be formed with their outer circumference and thus impart toothing on the disk carrier to be formed, wherein the forming depth of the profile rollers at the disk carrier to be formed is designed in such a way that a narrow, peripheral, self-contained, unformed bridge remains between the inner diameter and the outer diameter of the toothing, wherein the bridge increases the engine-speed strength of the disk carrier as a hoop band cylinder that is integrated into the toothing.

According to a third embodiment, a method for spin-forming disk carriers or the like is provided, which are designed as a pot-shaped sheet metal part having inner and outer teeth, wherein a multitude of cassettes is equidistantly arranged on the circumference of a tool, the cassettes having spinning tools arranged in their interior, which shape the disk carrier to be formed with their outer circumference and thus impart toothing on the disk carrier to be formed, wherein the forming depth of the profile elements at the spinning tool for the disk carrier to be formed is designed in such a way that a narrow, peripheral, self-contained, unformed bridge remains between the inner diameter and the outer diameter of the toothing, wherein the bridge increases the engine-speed strength of the disk carrier as a hoop band cylinder that is integrated into the toothing.

According to a fourth embodiment, a profile roller set, a spin-forming set, or a profile roller set for executing the methods according to the first, second or third embodiments, respectively are provided, wherein the axial length of the hoop band cylinder approximately equals the axial length of the disk carrier.

According to a fifth embodiment, a profile roller set for roll-forming disk carriers according to the second or fourth embodiments is provided, wherein a first profile roller set is designed for the production of the valley-like profile section of the toothing, a second profile roller set is designed for the production of the peak-like profile section in the area of the outer toothing, and a third profile roller set is designed for the fine-machining (calibration) of the valley and peak profile sections.

According to the fifth embodiment, the profile roller set includes the second and third profile roller set combined in a single profile roller set.

According to a sixth embodiment, a cassette is provided for holding profile roller sets according to at least one of the first to fifth embodiments, wherein on the rear wall of the cassette comprises a replaceable adjustment panel, wherein the thickness of the adjustment panel determines the profile depth (forming depth) of the toothing in the disk carrier.

According to a seventh embodiment, a roll-forming tool is provided having a multitude of equidistantly arranged cassettes in accordance with the sixth embodiment for executing the methods according to at least one of the first or third embodiments, wherein the cassettes with their radially inward-facing profile rollers form a central opening for inserting a workpiece to be formed and that the radially inward-facing distance of at least part of the profile rollers is designed to be adjustable.

According to the seventh embodiment, the roll-forming tool includes at least a part of all adjustment panels of the cassettes leveraged against a fixed machine housing with an adjustable radial distance.

According to the eighth embodiment, in the roll-forming tool according to one of the first to seventh embodiments, the radial distance between the cassettes and a machine housing surrounding the cassettes is adjustable.

The new method proposes the use of a profile roller set, which for the first time makes it feasible to produce such disk carriers in a roll-forming process.

This achieves a high production output and the utilized profile rollers result in higher component accuracy. Furthermore, the invention has the added advantage that the adjustability of the profile roller set is able to achieve even greater accuracy.

As an alternative to the roll-forming method according to the invention with a profile roller set, a spin-forming set can be used in the same manner.

The previously described anisotropy of the sheet metal material is minimized. The utilized profile roller set or alternatively the spin-forming set is able to treat each of the workpiece's groove positions that are equidistantly arranged over the outer circumference differently with regard to forming depth and shaping, which counters any out-of-round caused by anisotropy. A separate profile roller set is assigned to each groove tooth, which allows for choosing a different forming geometry and forming depth for each groove tooth.

The use of profile roller sets and alternatively, spin-forming sets yields the advantage of a significantly higher production output since a range of 10-30 strokes per minute can produce one part, which was not known in the prior art.

Although the previously specified extruding process also has a relatively high production output, it has the disadvantages of a high level of wear and tear of the extrusion tool and the unwanted deformations due to the anisotropy of the material, which are avoided in the present invention.

Accordingly, the invention is based on the insight that the tooth geometry must be designed in such a way that a narrow peripheral, self-contained bridge area remains between the inner diameter and the outer diameter of the toothing, which is also known as a hoop band cylinder and improves the engine-speed strength in an unexpected manner.

Because this hoop band cylinder rotates constantly, is self-contained, and comprises no bulges or other offsets, it achieves a significant increase of the toothing's engine-speed strength.

A component produced with the profile roller set is characterized in that a narrow peripheral, self-contained bridge area remains between the inner diameter and the outer diameter of the toothing, which is also known as hoop band cylinder and improves the engine-speed strength in an unexpected manner.

Accordingly, the forming depth of the profile rollers on the disk carrier to be formed is designed in such a way that a narrow peripheral, self-contained bridge area remains between the inner diameter and the outer diameter of the toothing, which improves the engine-speed strength as a hoop band cylinder.

Given the design of the toothing parameters with regard to the top and bottom diameter with the defined ratio $$Y<X$$

for internal disk carriers and external disk carriers, the strength of a toothed pot-shaped component by this definition is significantly higher than for previously known disk carriers.

Parameter Y, with reference to an external disk carrier, refers to the tooth head diameter Y of a radially inward-facing tooth head, while on the opposite side, parameter X refers to the tooth diameter X of a radially outward tooth.

In accordance with the invention, the value of X is always larger than Y, which means that an unformed bridge area results between the two diameter ranges of the larger diameter X and the smaller diameter Y in the area of the peripheral toothing, which forms a band that increases the engine-speed strength in an unexpected manner and is hereinafter referred to as hoop band.

The achieved improvement is in particular required for strain on the transmission of disk carriers and specifically for high speeds and torques.

When this design is taken into consideration, an unformed area theoretically results in the toothing profile. This is referred to as a speed band/hoop band. The theoretical formation of a circle of the smaller Y value and the larger X value produces a cylinder, namely the so-called hoop band cylinder.

Under strain, such a hoop band cylinder is significantly stronger than a disk carrier in which this ratio is not taken into account, which explains why the prior art did not achieve a continuous core in the manner of a hoop band cylinder.

The use of a device specifically designed for this purpose makes it feasible to produce this hoop band with a roll-forming and/or a spinning tool in roll-forming technology.

This allows for eliminating the bonding of the PCBs. The resulting service life of a roll-forming tool is many times higher than with conventional technology.

In a preferred embodiment of the present invention, the hoop band thickness is in the range of at least 0.5 mm, but can be up to 2 to 3 mm relative to an outside diameter of the toothing of approximately 300 to 400 mm.

It has been found that even a thin hoop band of an unformed bridge area is sufficient to significantly improve the engine-speed strength of a disk carrier produced in this manner.

The thickness of such an external disk carrier only needs to be 1 to 3 mm (in the area of the head wall), which refers to the area of the toothing that is subsequently called bridge or hoop band cylinder.

In reference to the prior art, which shows a bridge area of similar width, but without a hoop band cylinder, the external disk carrier according to the present invention differs in that the engine-speed strength of, for example, 10,000 revolutions per minute depending on the state of the art, can be increased to 14,000 revolutions per minute or more. This was not expected.

The advantage of the invention accordingly lies in that unformed center areas are arranged in the toothing of the component. These unformed center areas are referred to as hoop band cylinders, which preferably extend approximately over the entire axial length of the external disk carrier or the internal disk carrier, which improves the engine-speed strength in a significant way.

This was not obvious, as documented, for example by the subject of DE 10 2013 216 747 A1, in which it was attempted to increase the engine-speed strength by connecting an internal disk carrier with regular toothing to an external disk carrier, which resulted in an undesirably thick wall, wherein the two connected profile cylinders support one another to improve the engine-speed strength.

The disadvantage is the so-called corrugated sheet metal profile that is described and drawn in FIG. 2 of the present invention as prior art, which means that it is not possible to draw a radial, continuous, self-contained circumferential circle that is unformed through the toothing. For this reason, the prior art specifically does not comprise a hoop band cylinder as defined in the present invention.

The subject of the present invention not only results from the subject of the individual patent claims, but also from the combination of the individual patent claims.

All information and features disclosed in the documents, including in the summary, especially the spatial arrangement shown in the drawings, are claimed as essential to the invention, provided they are novel compared to prior art, either individually or in combination.

As far as individual items are referred to as "essential to the invention" or "important", this does not mean that these items necessarily have to be the subject to an independent claim. This is solely determined by the applicable version of the independent patent claim.

BRIEF DESCRIPTION OF THE DRAWINGS

The following section explains the invention in greater detail, using drawings that represent only one embodiment. The drawings and their description disclose further features and advantages of the invention.

The illustrations show the following:

FIG. 17 shows a prospective view of a cassette with a profile roller arranged therein in a rotatable manner.

FIG. 18 shows a lateral view of the cassette of FIG. 17.

DETAILED DESCRIPTION

Figure 1:
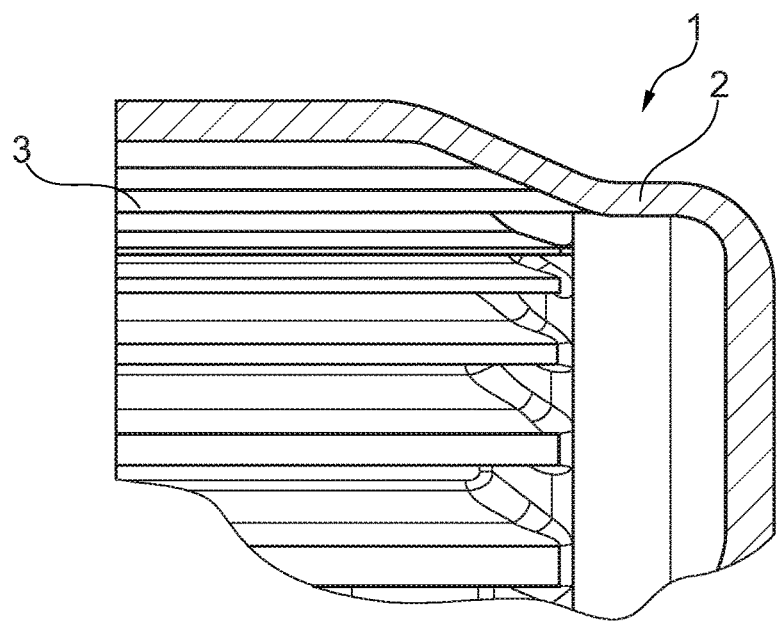
FIG. 1 shows a sectional detail of a disk carrier according to the prior art.

FIG. 1 shows a disk carrier 1 according to the prior art, which essentially comprises a cover 2, on the inside of which toothing 3 is arranged.

Figure 2:
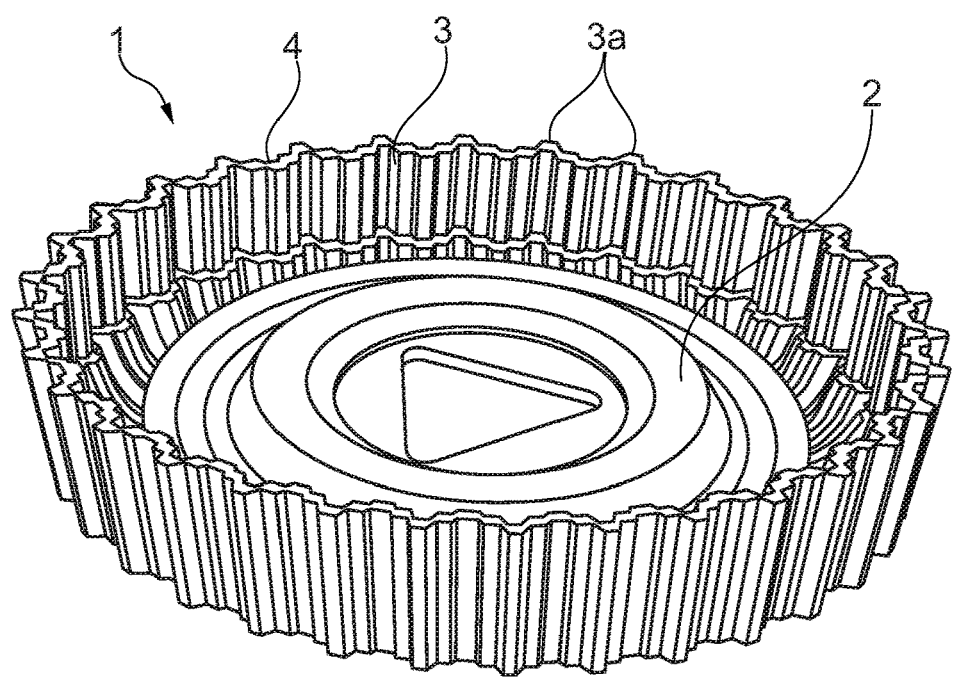
FIG. 2 shows a disk carrier according to prior art in accordance with DE 10 2013 216 747 A1.

FIG. 1 shows a sectional detail of a complete disk carrier from the prior art that is shown in FIG. 2. It is evident that disk carrier 1 has an undesirably thick wall 4, which consists of a double corrugated sheet metal profile, namely comprising the inner toothing 3, superseded by the larger wave-like toothing 3a, which results in the modulated corrugated sheet metal profile mentioned in the description and seen as a disadvantage.

The task of the invention is to balance such a wave-shaped toothing 3a with the toothing 3 so that the engine-speed strength of such a disk carrier can be significantly increased while decreasing or maintaining the same wall thickness.

Figure 3:
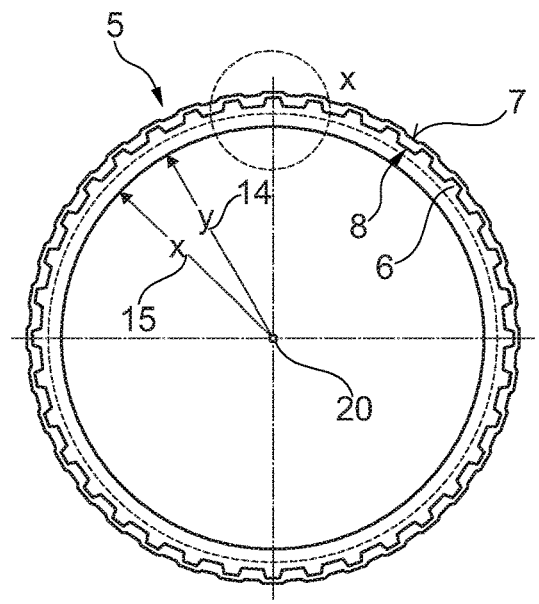
FIG. 3 shows a front view of a disk carrier in the manner of an external disk carrier in accordance with the invention.
Figure 4:
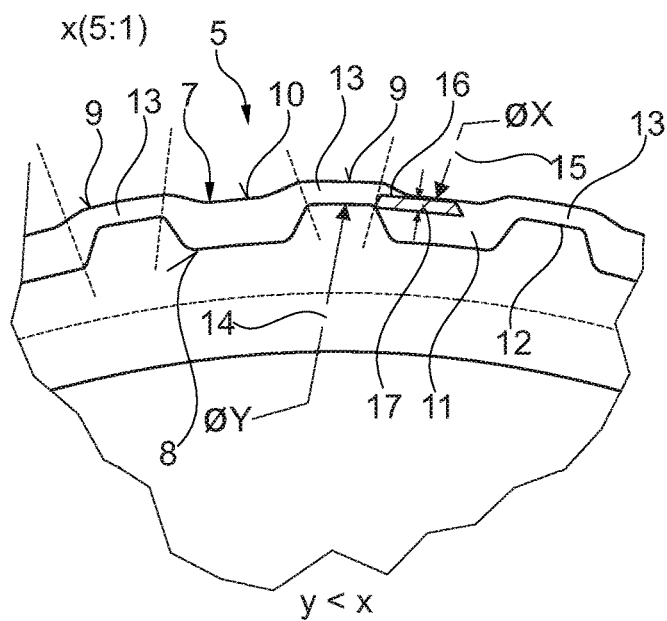
FIG. 4 shows an enlarged sectional detail of the external disk carrier of the section X from FIG. 3.
Figure 5:
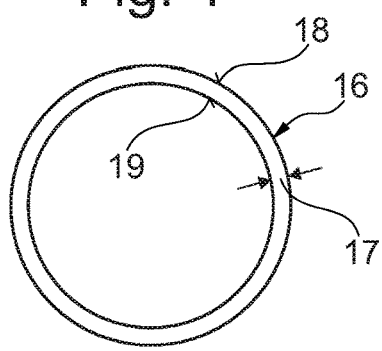
FIG. 5 shows a front view of the hoop band cylinder according to the invention with integrated toothing according to FIG. 4.

As shown in FIGS. 3 to 5, the invention features an external disk carrier (FIG. 3), which defines two different diameters X and Y from a rotation center 20.

Diameter X is the tooth diameter 15 according to FIG. 4, which shows the outside diameter of a valley-like profile section 10 of the toothing that is axially constricted inwardly.

The toothing according to the invention comprises an outer profile 7 according to FIGS. 3 and 4. The outer profile 7 is formed by the valley-like radially inward-facing profile section 10, which steadily transitions to a radially outward-facing, peak-like profile section 9.

Accordingly, this is an evenly unmodulated peak-valley profile of the outside profile 7, which means that the previous, modulated corrugated sheet metal profile can be eliminated.

The inner profile 8 of the outer disk carrier 5 in turn comprises a radially inward-facing tooth 11, which steadily and repeatedly transitions to a tooth head 12 with a larger diameter at equidistantly arranged locations around the circumference.

Accordingly, an unformed bridge 13 results between the two profile sections of the outer profile 7 and the inner profile 8, wherein said bridge surrounds the entire inner and outer toothing in the manner of a hoop band cylinder 16, thereby forming a closed cylinder as can be seen in FIG. 5.

Accordingly, the component according to the invention comprises an unformed hoop band cylinder 16 between the inner tooth head diameter 14 (parameter y) and the outer tooth diameter 15 (parameter x), which in the embodiment of the drawing has a hoop band thickness 17.

This hoop band thickness 17 in the area of the hoop band cylinder 16 significantly increases the engine-speed strength of the entire toothing, including at high rotational speeds because it is a closed hoop band, which holds the toothing together in radial and circumferential direction and protects and braces it against outward-facing centrifugal forces.

FIG. 5 is a schematic front view of such a hoop band cylinder 16. Hoop band cylinder 16 thus has an unformed rotationally symmetrical profile in the manner of a cylinder with an outer diameter 18 and an inner diameter 19. Since the hoop band cylinder 16 is completely shaped as a rotationally symmetrical cylinder component, it meets the requirement to optimally brace and capture centrifugal forces directed from the inside out.

Figure 6:
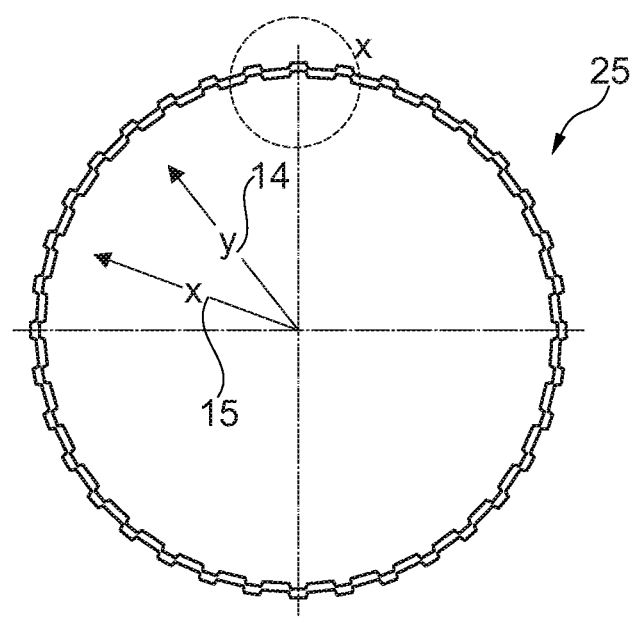
FIG. 6 shows a top view of internal disk carrier according to the invention.
Figure 7:
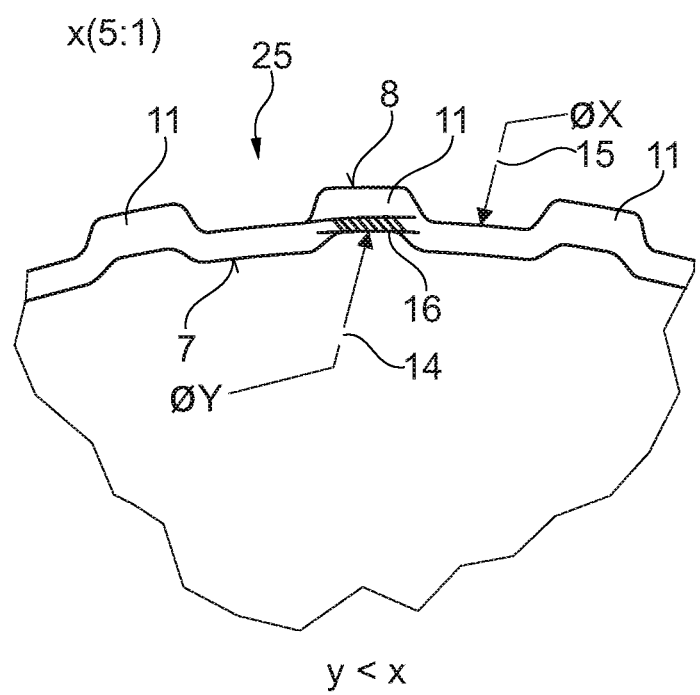
FIG. 7 shows and enlarged sectional view of a the section X from FIG. 6.

The same conditions also apply to an internal disk carrier 25, as shown in FIGS. 6 and 7, which is shaped in the same manner as the external disk carrier 5 in accordance with FIGS. 3 to 5.

Again, there is an unformed hoop band cylinder as a rotationally symmetrical cylinder component, which extends over the entire axial length of the internal disk carrier 25 and thus absorbs the centrifugal forces generated by the rotation.

The modulated corrugated sheet metal profile, which was seen as a disadvantage, is therefore eliminated in the invention, for the internal and the external disk carrier.

A component of a disk carrier produced in this manner is therefore able to absorb significantly higher rotational speeds with the same or reduced wall thickness—compared to equivalent components of the prior art—than the disk carriers of the prior art, as shown for example in FIGS. 1 and 2.

Figure 8:
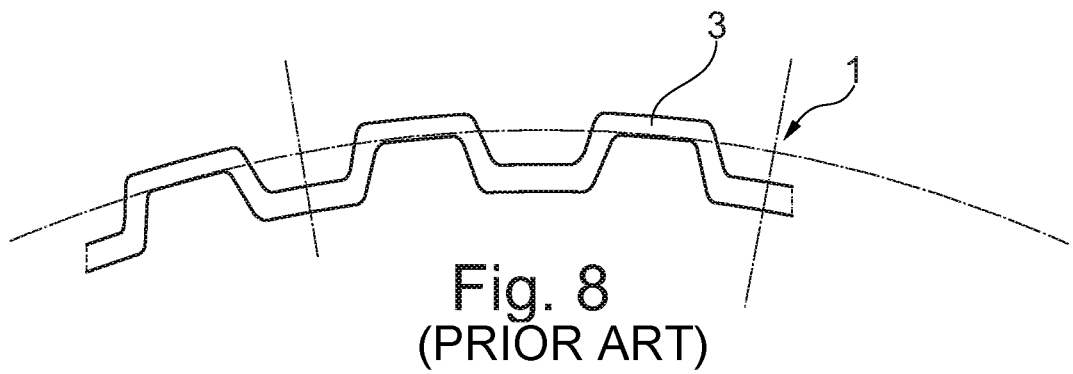
FIG. 8 shows toothing according to the prior art.
Figure 9:
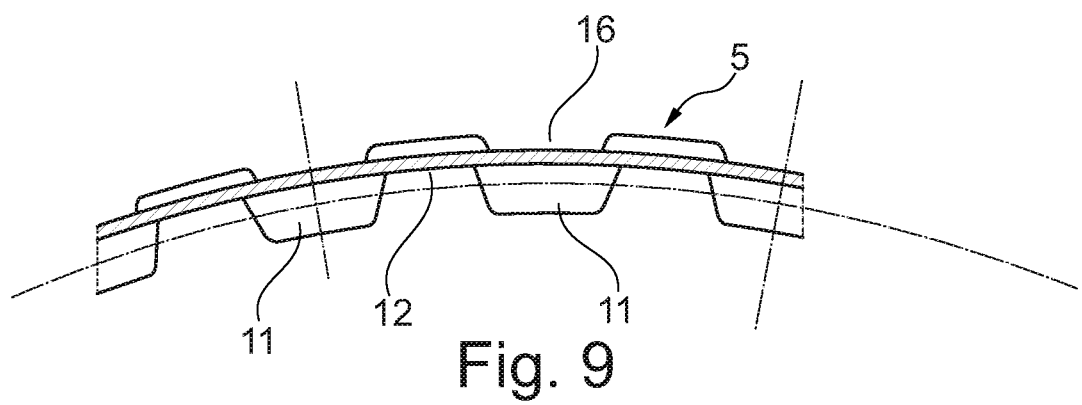
FIG. 9 shows toothing according to the invention in an external disk carrier according to the invention.
Figure 10:
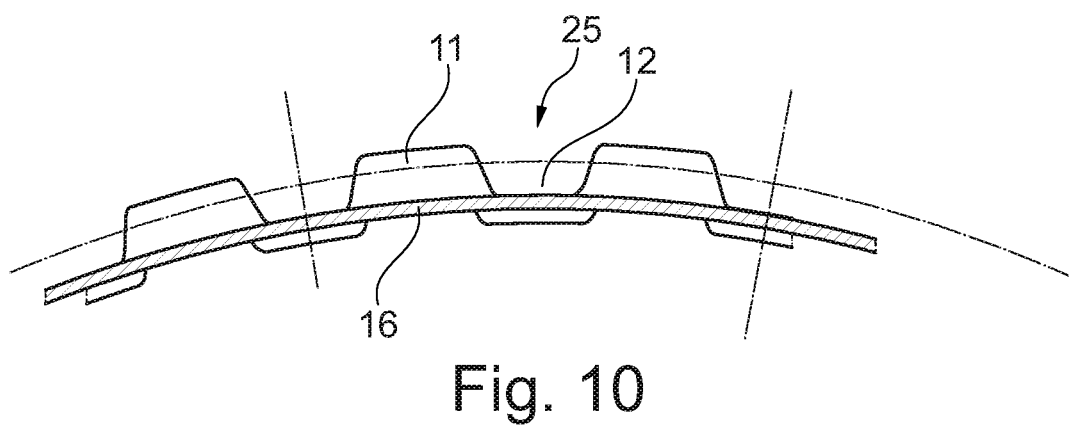
FIG. 10 shows toothing according to the invention in an internal disk carrier.

FIGS. 8 to 10 show the contrast of the different tooth formations, wherein FIG. 8 shows the conventional toothing 3 of a conventional disk carrier 1, while FIG. 9 shows the formation of a continuous rotationally symmetrical cylinder area between the internal and external toothing, which is shown as hoop band cylinder 16.

The same conditions apply to the internal disk carrier 15 of FIG. 10, in which hoop band cylinder is radially offset inwards from the external disk carrier.

FIGS. 11 to 18 then display preferred tools that are suitable for producing the toothing according to the invention.

Figure 11:
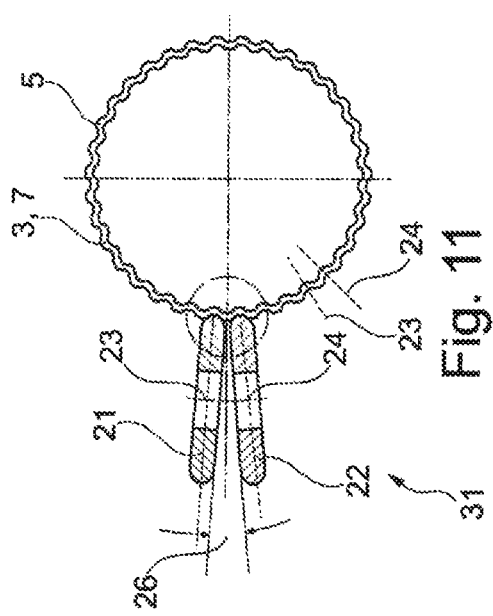
FIG. 11 shows a schematic representation of a roller set for the manufacture of an external disk carrier.
Figure 15:
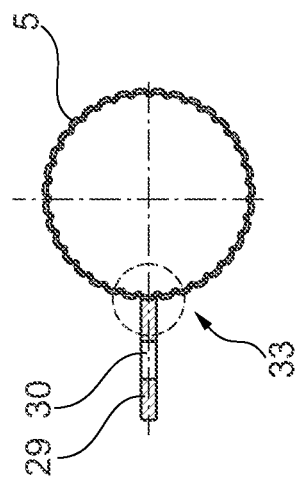
FIG. 15 shows an additional roller set for producing an external disk carrier.
Figure 16:
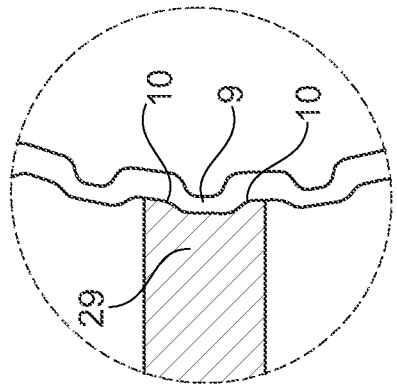
FIG. 16 shows an enlarged representation of the roller set according to FIG. 15.

FIG. 11 initially shows the toothing of an external disk carrier 5 as an example, wherein three different profile roller sets are used, namely profile roller set 31 for producing the valley-like profile section 10 (see FIG. 12), profile roller set 32 for producing the peak-like profile section 9 in the area of the external toothing, and profile roller set 33 for fine-machining (calibration) of peak and valley profile sections 9, 10 according to FIGS. 15 and 16.

It goes without saying that the respective processing of the external profile 7 in accordance with FIGS. 11 to 16 involves a counter-piece not represented in greater detail, having an identical profile, which is arranged in the interior space of external disk carrier 5, into the profile of which the component profile according to the invention is formed.

The same applies to the production of the internal disk carrier 25 in an analog manner.

The first step is to describe the profile roller set 31, which in accordance with FIG. 11 consists of two profile rollers 21, 22, positioned at an inclination angle 26, which form a pair of rollers, wherein each profile roller 21 comprises a rotation axis 23 and 24.

As will be explained below, the profile rollers mentioned here are contained in a cassette, wherein a multitude of cassettes is equidistantly arranged over the circumference and arranged so that a complete processing set consists of a multitude of profile rollers 21, which are arranged equidistantly at the circumference of the outer profile 7 of the external disk carrier 5.

The arrangement of the profile rollers in cassettes on the inner circumference of a support tool has the advantage that each cassette can take up a profile roller set that is adapted to the groove tooth of the disk carrier in each case, which allows for allocating an individual profile roller set to each groove tooth of the disk carrier.

The profile rollers can either be arranged in a rotatable manner on a bearing axis within the corresponding cassette or can be contained in the cassette without an axis.

Figure 12:
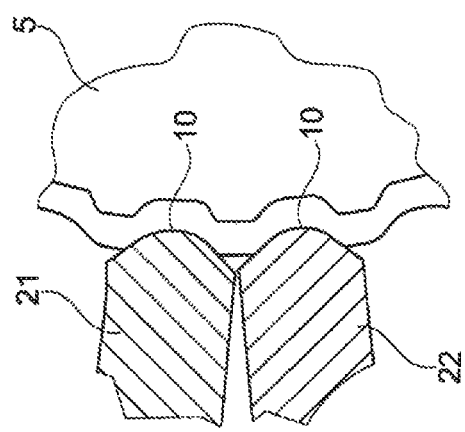
FIG. 12 shows an enlarged representation of a roller set according to FIG. 11.

The valley-shaped profile sections 10 are rolled out using the profile rollers 21, 22, which are positioned toward another in inclination angle 26, as shown in FIG. 12.

Figure 13:
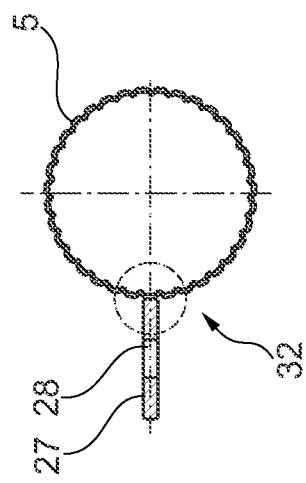
FIG. 13 shows a roller set for producing the toothing at an external disk carrier.
Figure 14:
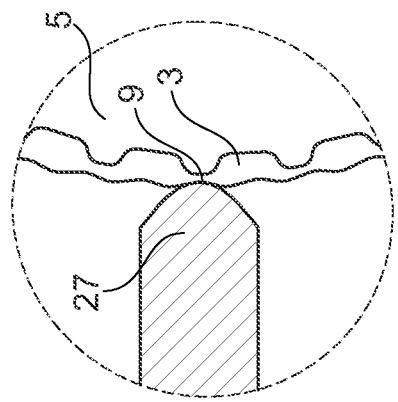
FIG. 14 shows an enlarged detail according to representation in FIG. 13.

As shown in FIGS. 13 and 14, an additional profile roller 27 is used, which is suitable for roll-forming the small profiled profile sections 9 (peak areas), as shown in FIG. 14.

This type of profile roller 27 is also contained in a cassette and all cassettes are arranged equidistantly at the circumference, thus forming a roll-forming tool that is, for example, the subject of the separate DE 10 2010 053 547 A1.

Again, the corresponding profile roller 27 is kept in the range of a rotary axis 28 within a cassette that is not further specified.

The same applies to FIGS. 15 and 16, wherein a profile roller 29 is designated for fine machining of the peak-like profile sections 9 and the valley-like profile sections 10. This roller is designed in such a way that the corresponding profile forms roll out the valley-like profile sections 10 as well as the peak-like profile sections 9, using a profile mandrel not further specified, which is positively connected to the inner circumference.

It goes without saying that an internal disk carrier 25 is produced in the same manner.

As in the case of the profile roller set shown here, the radially outward-facing section, which is labeled interior profile 8 in FIG. 7, is produced for the internal disk carrier 25.

In relation to the profile designated as "exterior profile 7" in FIG. 7, it is therefore a counter-piece, which provides leverage against the radially inward-facing profile roller sets arranged on the outer circumference.

FIGS. 17 and 18 therefore show a suitable forming tool, which in the displayed embodiment comprises two cassette halves 38, 39 arranged in mirror symmetry, between which the profile roller 29, 31, 32, 33 is held, respectively.

Profile roller 29 is shown as an example, wherein the other profile rollers are held by the corresponding cassettes in accordance with the drawings of FIGS. 11, 13 and 15 in the same way as shown.

The profile roller 29 attached there has a rotatable bearing in the directions of rotation 35 and is arranged on a bearing bolt 41 having a rotatable bearing in the associated recess in the cassette.

Accordingly, a circumferential space 42 forms in the cassette as an open space so that the profile roller held there is freely rotatable.

Of course, the invention is not limited to a profile roller 29, 31, 32, 33 with a rotatable bearing in a bearing bolt 41.

The corresponding profile section 36 corresponds to the profile section that was described for profile rollers 29, 31, 32, 33.

The corresponding profile roller therefore protrudes from a section 37 of cassette 34 with part of its outer circumference.

The rear wall of cassette 34 comprises an adjustment panel 40, which essentially consists of a plug-in attachment 43, which extends over the clearance of the cassette and which is used to insert the cassette into a recess not further specified.

It is important that the adjustment panel 40, which adjoins the plug-in attachment 43 from the inside, is replaceable and has a variable adjustment thickness 44.

In this manner, the profile depth of a toothing can be determined by replacing an adjustment panel 40 with different adjustment thickness.

The larger the adjustment thickness 44 of adjustment panel 40, the deeper the toothing of the profile rollers braced against the outer circumference of a disk carrier.

Figure 20:
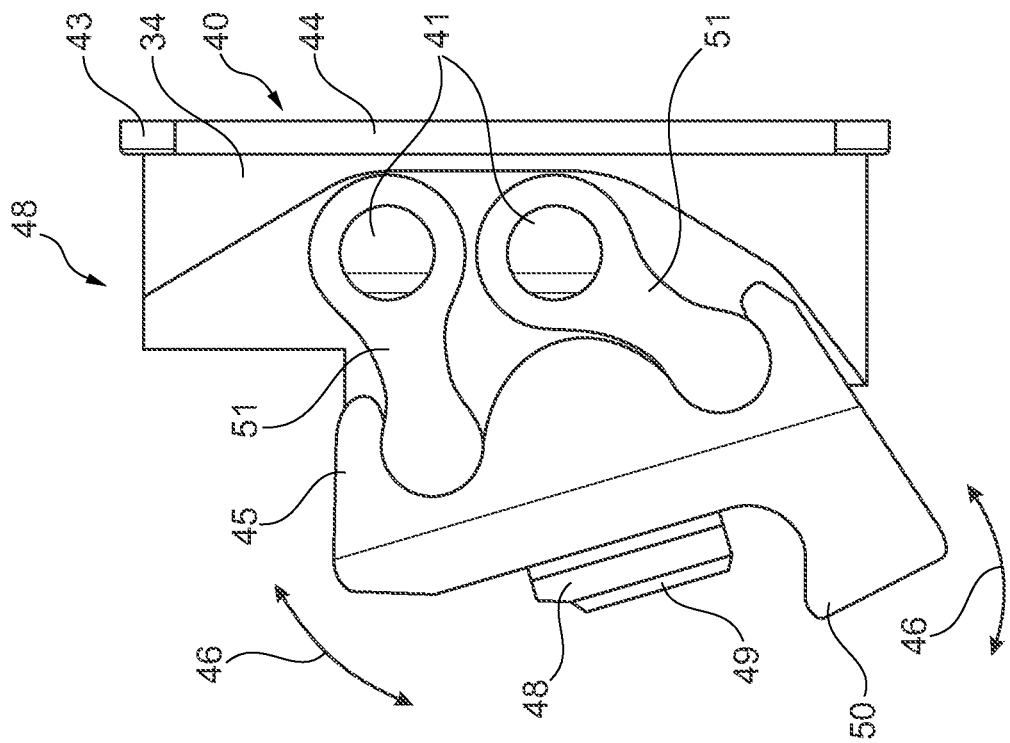
FIG. 20 shows a schematic view of the interior structure of the spinning tool according to FIG. 19.
Figure 19:
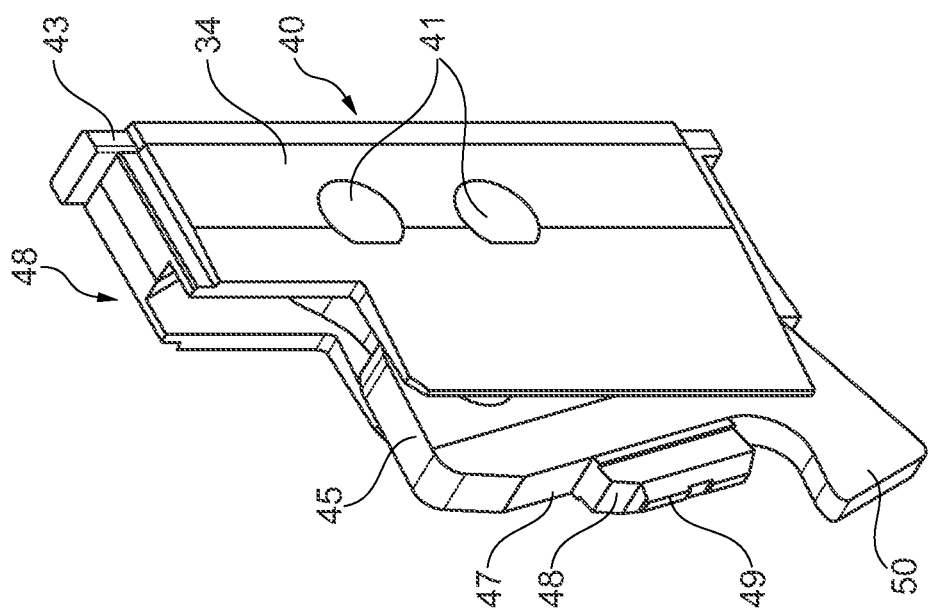
FIG. 19 shows a perspective view of an alternative tool shape compared to FIGS. 17 and 18 showing a spinning tool.

FIGS. 19 and 20 show that the invention is not limited to a roll-forming tool. In another embodiment the design may include a spinning tool instead of a roll-forming tool. Such a spinning tool 48 is shown in FIGS. 19 and 20.

The same explanations as for the profile roller set described above regarding the production of an external or internal disk carrier 5, 25 apply to this spinning tool.

Instead of roll-forming the profile, this embodiment uses a spinning tool, wherein a workpiece holder 45 has a spinning tool 48 arranged on its front side 47, wherein the front part of the spinning tool is formed by a profile element 49 which matches the profile shape of one of the profile rollers described above.

In this manner, each profile roller can be replaced by a corresponding spinning tool 48.

Workpiece holder 45 on its underside has a radially inward-facing cam tab 50, which causes one upward movement per stroke. The entire workpiece holder is moved back and forth in the manner of a pendulum in the direction of the arrows 46. The connecting rods 51 have a rotatable attachment in the corresponding bearing bolt 41 in the area of cassette 34.

The other end of connecting rods 51 meshes with the associated, unilaterally open bearing shells at workpiece holder 45 in such a way that it executes a back and forth pendulum movement in the direction of the arrows 46 and accordingly, generates a profile at an external disk carrier 5 or an internal disk carrier 25, in the exterior area.

Again, the spinning tool 48 has a counter-piece on the opposite side, which is shaped as a profile mandrel.

The component according to the invention in the form of a disk carrier 1, 5, 25 preferably consists of a metal part in fine-grain quality with suitable ductility for roll-forming and/or spin-forming. The material thicknesses suitable for this purpose are listed above.

A suitable set for tools for roll-forming provides that each of the cassettes holding the roll-forming tools are sequentially arranged in axial direction of the disk carrier 1, 5, 25 in a processing machine in such a way that the disk carrier to be formed initially moves to the area of the first cassette for forming the first profile section. After leaving the first cassette, it moves in axial direction to reach the work area of the second cassette axially adjoining in the conveyor direction of the disk carrier, where the second profile section is formed. After leaving this second cassette, it moves in axial direction to reach the work area of the third cassette adjoining in the conveyor direction of the disk carrier, where calibration takes place.

In a further embodiment, the roll-forming tools for roll-forming in the second and third cassette may be combined in a single cassette. In that case, calibration takes place during roll-forming in the second cassette and the third cassette is omitted.

Figure 21:
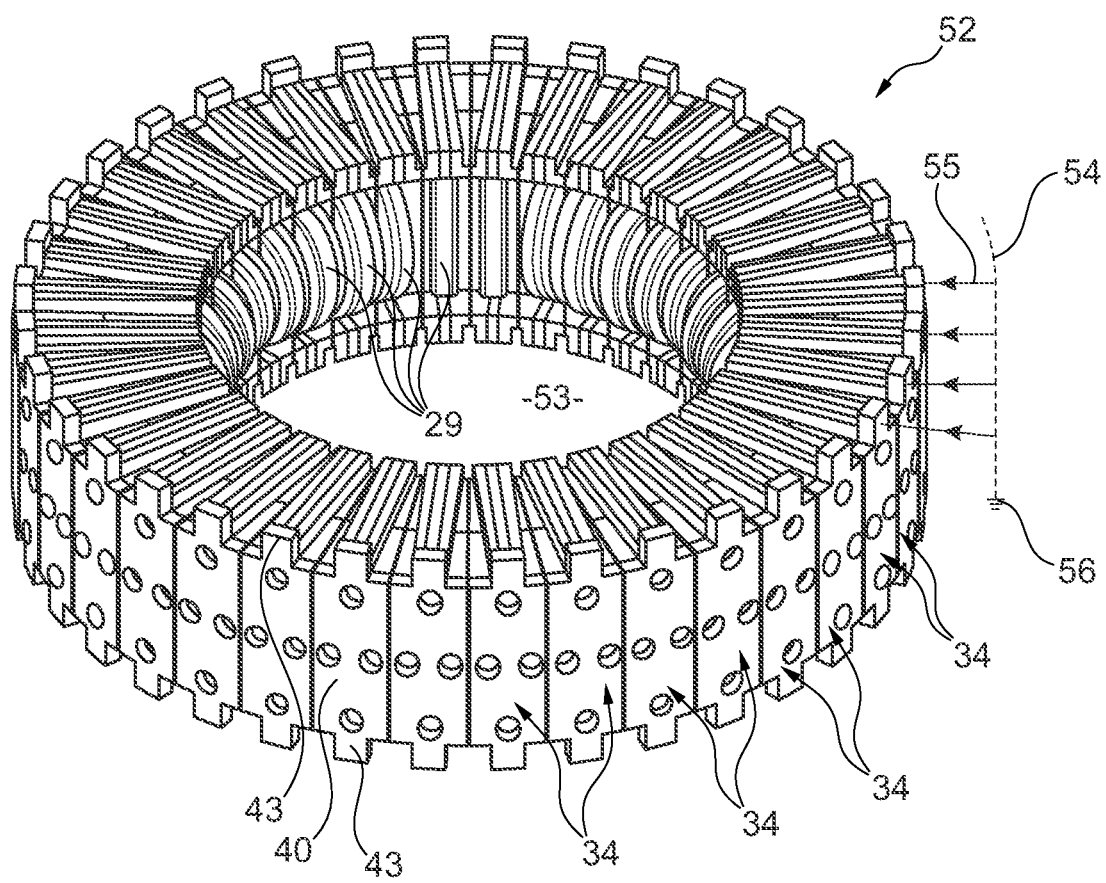
FIG. 21 shows a perspective view of a roll-forming tool according to the design of FIGS. 17 to 18 or according to the design of FIG. 19-20.

The embodiment according to FIG. 21 shows a roll-forming tool 52 comprising a multitude of cassettes 34 equidistantly arranged on the outer circumference, wherein each cassette 34 holds one or more profile rollers 21, 22, 27, 29. Cassette 34 can either be designed according to FIG. 17-18 or FIG. 19-20.

Accordingly, the roll-forming tool 52 comprises a multitude of cassettes 34 equidistantly arranged on the circumference, wherein the cassettes 34 with their radially inward-facing profile rollers 21, 22, 27, 29 form a central opening 53 for inserting the workpiece to be formed and wherein the radially inward-facing distance 55 of at least part of the profile rollers 21, 27, 29 is adjustable.

At least a part of all adjustment panels 43 of the cassettes 34 is leveraged against a fixed machine housing 56 with an adjustable radial distance 55. Thus, a part or all of the cassettes 34 can be designed to be adjustable.

It was described above that the radial distance of the adjustment panels 40 on the sides of the cassettes can be adjusted by arranging adjustment panels 40 in different thicknesses. However, the direction of the arrow at number 55 shows that the distance can be adjusted by way of arranging set screws that are not shown. The relevant set screw is, e.g., inserted in a threaded hole of the adjustment panel 40 and braces its head against the inside of a fixed machine housing 56 from which a ring, which is either closed or divided into segments surrounds the roll-forming tool 52 at its outer circumference as shown in FIG. 20. In a reversal of this adjustment principle, the setting screw can also be adjustably inserted in a threaded hole of the machine housing 56 and brace its head on the adjustment panel 40.

Instead of setting the radial distance 55 with threaded means, other adjustment methods, such as eccentric bolts, eccentric washers or similar can be used as well.

DRAWING LEGEND

1 Disk carrier
2 Cover
3 Toothing 3a Toothing
4 Wall
5 External disk carrier
6 Internal toothing
7 External profile
8 Internal profile
9 Profile section (peak)
10 Profile section (valley)
11 Tooth
12 Tooth head
13 Bridge
14 Tooth head diameter Y (of 12)
15 Tooth diameter X (of 11)
16 Hoop band cylinder
17 Hoop band thickness
18 Outer circumference (of 16)
19 Inner circumference (of 16)
20 Rotation center
21 Profile roller (21+22=roller pair for 16)
22 Profile roller (21+22=roller pair for 16)
23 Rotation axis (of 21)
24 Rotation axis (of 22)
25 Internal disk carrier
26 Inclination angle
27 Profile roller (for 9)
28 Rotation axis
30 Profile roller (for 9+10)
31 Roller set (for 21+22)
32 Roller set (for 27)
33 Roller set (for 29)
34 Cassette
35 Rotational direction
36 Profile section
37 Recess
38 Cassette half
39 Cassette half
40 Adjustment panel
41 Bearing bolt
42 Circumferential space
43 Plug-in attachment
44 Adjustment thickness
45 Workpiece holder
46 Direction of arrow
47 Front side
48 Spinning tool
49 Profile element
50 Cam tab
51 Connection rod
52 Roll-forming tool
53 Opening
54 Counter-piece
55 Radial distance
56 Machine housing

The invention claimed is:

1. A method for roll-forming a disk carrier from a sheet metal part to form toothing having inner and outer teeth are created in the sheet metal part, the method comprising:
arranging a plurality of cassettes spaced equidistantly from one another around a circumference of a roll-forming tool, each of said plurality of cassettes having an interior in which profile rollers are arranged,
setting a forming depth of the profile rollers at a given position to create a narrow, peripheral, self-contained, unformed bridge that remains between an inner diameter and an outer diameter of the toothing of the disk carrier, said bridge defining a hoop band cylinder that is integrated into the toothing to increase engine-speed strength of the disk carrier, said hoop band cylinder having an axial length approximately equal to an axial length of the disk carrier, and
rolling an outer circumference of the profile rollers relative to the sheet metal part to form the toothing and the hoop band cylinder on the disk carrier,
wherein the toothing comprises an outer profile of the disk carrier which is formed by radially inward-facing profile sections, which steadily transition to radially outward-facing, profile sections,
wherein the toothing comprises an inner profile of the disk carrier, the inner profile comprising radially inward-facing teeth, which steadily and repeatedly transition to teeth heads with larger diameters at equidistantly arranged locations around an entire circumference of the disk carrier,
wherein the hoop band cylinder is defined between the two profile sections of the outer profile and the inner profile, and the two profile sections of the radially outward-facing profile section and the teeth heads, and wherein said hoop band cylinder extends around the entire circumference of the disk carrier.

2. A profile roller tool for roll-forming a disk carrier from a sheet metal part having toothing comprising inner and outer teeth, comprising:
- a plurality of cassettes spaced equidistantly on a circumference of a roll-forming tool, each of said plurality of cassettes having a plurality of profile rollers arranged in an interior of each of the plurality of cassettes, an outer circumference of the plurality of profile rollers positioned within the plurality of cassettes so as to roll relative to the sheet metal part to form the toothing on the disk carrier,
- wherein the plurality of profile rollers have a given forming depth with respect to the sheet metal part to create a narrow, peripheral, self-contained, unformed bridge remaining between an inner diameter and an outer diameter of the toothing, said bridge defining a hoop band cylinder that is integrated into the toothing to increase engine-speed strength of the disk carrier, said hoop band cylinder having an axial length approximately equals an axial length of the disk carrier,
- wherein the plurality of profile rollers are configured to form the toothing so as to comprise an outer profile which is formed by radially inward-facing profile sections, which steadily transitions to a radially outward-facing profile sections,
- wherein the plurality of profile rollers are further configured to form the toothing so as to comprise an inner profile of the disk carrier, the inner profile comprising radially inward-facing teeth, which steadily and repeatedly transitions to teeth heads with larger diameters at equidistantly arranged locations around an entire circumference of the disk carrier,
- wherein the plurality of profile rollers are further configured to form the hoop band cylinder defined between the outer profile and the inner profile so as to extend around the entire circumference of the disk carrier.

3. The profile roller tool according to claim 2, wherein the plurality of profile rollers comprise:
- at least one first profile roller to produce the radially inward-facing profile sections of the toothing,
- at least one second profile roller to produce the radially outward-facing profile sections, and
- at least one third profile roller to finely machine the radially inward-facing and radially outward-facing profile sections.

4. The profile roller tool according to claim 3, wherein the at least one second and third profile rollers each comprise a single profile roller.

5. The profile roller tool of claim 2, wherein the plurality of cassettes comprise a replaceable adjustment panel disposed on a rear wall of each of the plurality of cassettes, wherein a thickness of said adjustment panel determines the forming depth of the toothing in the disk carrier.

6. The profile roller tool according to claim 5, further comprising a machine housing, wherein at least a part of the adjustment panel of the plurality of cassettes is leveraged against the machine housing spaced at an adjustable radial distance.

7. The profile roller tool according to claim 5, wherein the thickness of said adjustment panel determines the forming depth of the toothing in the disk carrier.

8. The profile roller tool in accordance with claim 2, wherein each of the plurality of profile rollers comprise a plurality of radially inward-facing profile rollers that form a central opening for inserting the sheet metal part and a radially inward-facing distance of at least some of the radially inward-facing profile rollers is adjustable.

9. The profile roller tool in accordance with claim 2, further comprising a machine housing, wherein each of the plurality of cassettes comprise adjustment panels, and at least a part of the adjustment panels of the plurality of cassettes is leveraged against the machine housing spaced at an adjustable radial distance.

10. The profile roller tool according to claim 2, further comprising a machine housing, wherein a radial distance between the plurality of cassettes and the machine housing surrounding the plurality of cassettes is adjustable.

11. A method for spin-forming a disk carrier from a sheet metal part to form toothing having inner and outer teeth, comprising:
- arranging a plurality of cassettes equidistantly on a circumference of a tool, each of said plurality of cassettes having an interior in which spinning tools are arranged and profile elements disposed at a front surface of the spinning tools,
- setting a forming depth of the profile elements at a given position to create, in accordance with the given position, a narrow, peripheral, self-contained, unformed bridge that remains between an inner diameter and an outer diameter of the toothing of the disk carrier, said bridge defines a hoop band cylinder that is integrated into the toothing to increase engine-speed strength of the disk carriers, and said hoop band cylinder having an axial length approximately equals an axial length of the disk carrier, and
- shaping the disk carrier to be formed with an outer circumference of the profile elements to form the toothing and the hoop band cylinder on the disk carrier, the shaping comprising:
  - forming radially inward-facing profile sections, which steadily transition to radially outward-facing profile sections, to form an outer profile of the disk carrier comprising the toothing,
  - forming the toothing comprising an inner profile of the disk carrier, the toothing comprising radially inward-facing teeth, which steadily and repeatedly transition to teeth heads with larger diameters at equidistantly arranged locations around an entire circumference of the disk carrier,
  - forming the hoop band cylinder between the two profile sections of the outer profile and the inner profile, and the two profile sections of the radially outward-facing profile section and the tooth head so as to extend around the entire circumference of the disk carrier.

* * * * *